（12） United States Patent
Sugar et al.

(10) Patent No.: US 7,058,383 B2
(45) Date of Patent: Jun. 6, 2006

(54) SIGNAL INTERFACING TECHINQUES TO SIMPLIFY INTEGRATED CIRCUIT RADIO DESIGNS (75) Inventors: Gary L. Sugar, Rockville, MD (US); Robert M. Masucci, Potomac, MD (US); Michael F. Toner, Ottawa, CA (US)

(73) Assignee: IPR Licensing, Inc., Wilmington, DE (US)

( * ) Notice: Subject to any disclaimer, the term of this patent is extended or adjusted under 35 U.S.C. 154(b) by 86 days.

(21) Appl. No.: 10/707,447

(22) Filed: Dec. 15, 2003

(65) Prior Publication Data

US 2004/0242183 A1 Dec. 2, 2004

Related U.S. Application Data (60) Provisional application No. 60/474,494, filed on May 30, 2003, provisional application No. 60/481,139, filed on Jul. 25, 2003.

(51) Int. Cl.
*H04B 1/28* (2006.01)
*H04B 1/40* (2006.01)

(52) U.S. Cl. .................. 455/333; 455/84; 375/219
(58) Field of Classification Search ........... 455/73, 455/78, 84, 333, 550.1; 375/219, 289, 320, 375/322
See application file for complete search history.

(56) References Cited

U.S. PATENT DOCUMENTS

| 5,761,463 A | 6/1998 | Allen .................... 395/309 |
| 6,567,878 B1 | 5/2003 | Wettroth et al. ............ 710/305 |
| 6,650,371 B1 | 11/2003 | Morrish et al. ............. 348/569 |
| 6,662,003 B1 | 12/2003 | Elder et al. ................ 455/333 |

FOREIGN PATENT DOCUMENTS

GB 2349309 A 10/2000

OTHER PUBLICATIONS

Maxim, "Charlieplexing EReduced Pin-Count LED Display Multiplexing," APP 1880: Feb. 10, 2003.
International Search Report in PCT/US04/15339, dated Dec. 8, 2004 (3 pages).
Written Opinion of International Searching Authority in PCT/US04/15339, dated Dec. 8, 2004 (3 Pages).

*Primary Examiner*—Quochien B. Vuong
(74) *Attorney, Agent, or Firm*—Volpe and Koenig, P.C.

(57) ABSTRACT

A signal interfacing technique for connecting signals between a signal processing device and a radio integrated circuit (IC) involving multiplexing two or more signals on a connection pin between the radio IC and a signal processing device. According to one technique, transmit and receive signals are multiplexed such that during a transmit mode a transmit signal is coupled on the connection pin from the signal processing device to the radio IC, and during a receive mode a receive signal is coupled from the radio IC on the connection pin to the signal processing device. According to another technique, in-phase (I) and quadrature (Q) signals are multiplexed on a connection pin during both transmit and receive modes.

23 Claims, 6 Drawing Sheets

SIGNAL INTERFACING TECHINQUES TO SIMPLIFY INTEGRATED CIRCUIT RADIO DESIGNS

This application claims priority to U.S. Provisional Application No. 60/474,494, filed May 30, 2003 and to U.S. Provisional Application No. 60/481,139 filed Jul. 25, 2003. The entirety of each of these applications is incorporated herein by reference.

BACKGROUND OF INVENTION

The present invention is related to radio transceiver integrated circuits (ICs), and more particularly, to a method to reduce the complexity and increase the performance of a radio IC.

The design and development of radio ICs often involves optimizing one or more of several attributes of the IC. Examples of such attributes are: IC development duration and risk (e.g., time to market), power consumption, onchip noise, silicon area (to reduce overall chip size) and the number of connection pins. Reducing the number of pins on the radio IC may provide significant power consumption improvements, and mitigate development risks.

A signal interface connection system and method is needed for connecting a radio IC with a baseband signal processing IC or similar signal processing device using a minimum number of pins, and supporting circuitry that does not unduly add to the silicon area, power consumption and development risk to the radio IC.

SUMMARY OF INVENTION

Briefly, a signal interfacing technique is provided for connecting signals between a signal processing device and a radio IC by multiplexing two or more signals on a connection pin between the radio IC and the signal processing device. According to one technique, transmit and receive signals are multiplexed such that during a transmit mode a transmit signal is coupled on the connection pin from the signal processing device to the radio IC, and during a receive mode a receive signal is coupled from the radio IC on the connection pin to the signal processing device. This pin sharing technique is supported by a switch in the radio IC and a control technique for an analog-to-digital converter (ADC) and a digital-to-analog converter (DAC) external to the radio IC.

According to another technique, transmit I and Q signals are multiplexed on a transmitter connection pin such that the transmit I signal and transmit Q signal are coupled from the transmitter connection pin during different time intervals to the appropriate signal path of the transmitter. Similarly, the receive I and Q signals are multiplexed on a receiver connection pin such that the receive I signal and receive Q signal are coupled to the receiver connection pin during different time intervals from the appropriate signal path of the receiver.

The first technique involves multiplexing both transmit and receive signals over the same pin whereby during a transmit mode, the pin is used for transmit signals and during a receive mode the same pin is used for receive signals. The second technique involves multiplexing, e.g., alternating in time, transmit I and Q signals on the same pin during a transmit mode and alternating receive I and Q signals on the same pin during a receive mode. Both techniques reduce the number of pins required in a radio IC and a baseband IC for connecting the transmit and receive signals therebetween.

The above and other objects and advantages will become more readily apparent when reference is made to the following description taken in conjunction with the accompanying drawings.

DETAILED DESCRIPTION

Figure 1:
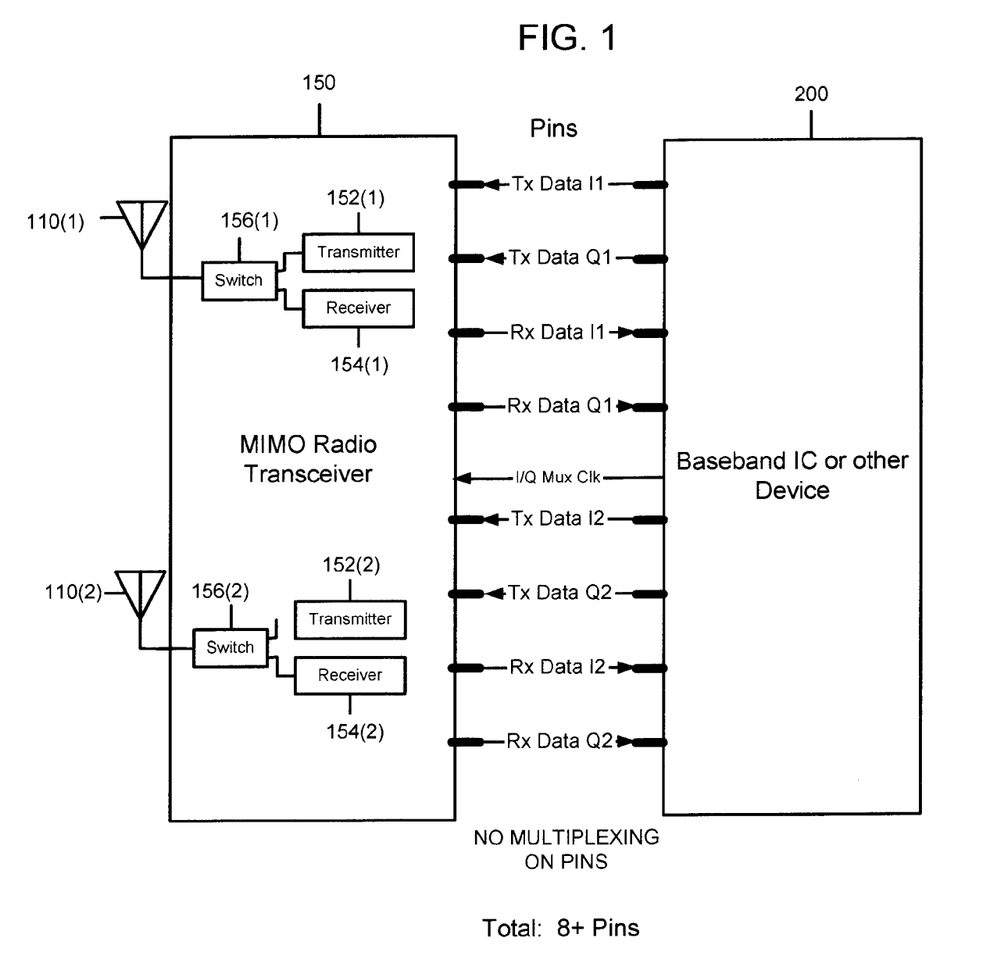
FIG. 1 is a block diagram showing a method for connecting a radio IC to a baseband IC that does not employ any pin reduction techniques.

FIG. 1 shows a multiple-input multiple-output (MIMO) radio IC 150 and a baseband IC 200 that are connected together to exchange transmit and receive signals. A MIMO radio IC has a unique design whereby there are multiple transmitters that simultaneously transmit a plurality of transmit signals supplied by the baseband IC and multiple receivers that simultaneously receive a plurality of receive signals for processing by the baseband IC. MIMO radio algorithms have substantial signal-to-noise ratio (SNR) and data rate advantages and require the simultaneous transmission and simultaneous reception of radio signals. A fully integrated MIMO radio IC is disclosed in commonly assigned co-pending U.S. application Ser. No. 10/065,388, filed Oct. 10, 2002, the entirety of which is incorporated herein by reference.

Designing a MIMO radio IC is particularly challenging because the number of components on the IC is duplicated depending on the number of antenna paths the radio supports. A 2-antenna path radio is shown in FIG. 1, but it should be understood that a MIMO radio IC could support 3 or more antenna paths. For each antenna path 110(1) and 110(2), there is a transmitter 152, receiver 154 and switch 156, so identified by the corresponding index (i), where i=1 or 2 for a 2-antenna path radio. The switch 156 is used to couple either the transmitter or receiver to the corresponding antenna.

On a MIMO radio IC, the number of connection pins can be numerous and the supporting circuitry complex because of the duplicitous nature of a MIMO radio. For example, at least 8 pins are required to support the connections shown in FIG. 1 in which I and Q signals are used for each antenna path. If differential signal paths are employed as well, than for each pin shown in FIG. 1, there would be a pair of pins to transfer the differential (+ and −) signals, thus requiring 16 pins. It should be understood that each of the transmitter and receive blocks shown in FIG. 1 would include separate sections for I and Q upconversion and downconversion, respectively, but the components are not shown in FIG. 1 for simplicity. FIG. 1 does not represent prior art but rather one signal interface technique that for some applications may not be desirable.

Figure 2:
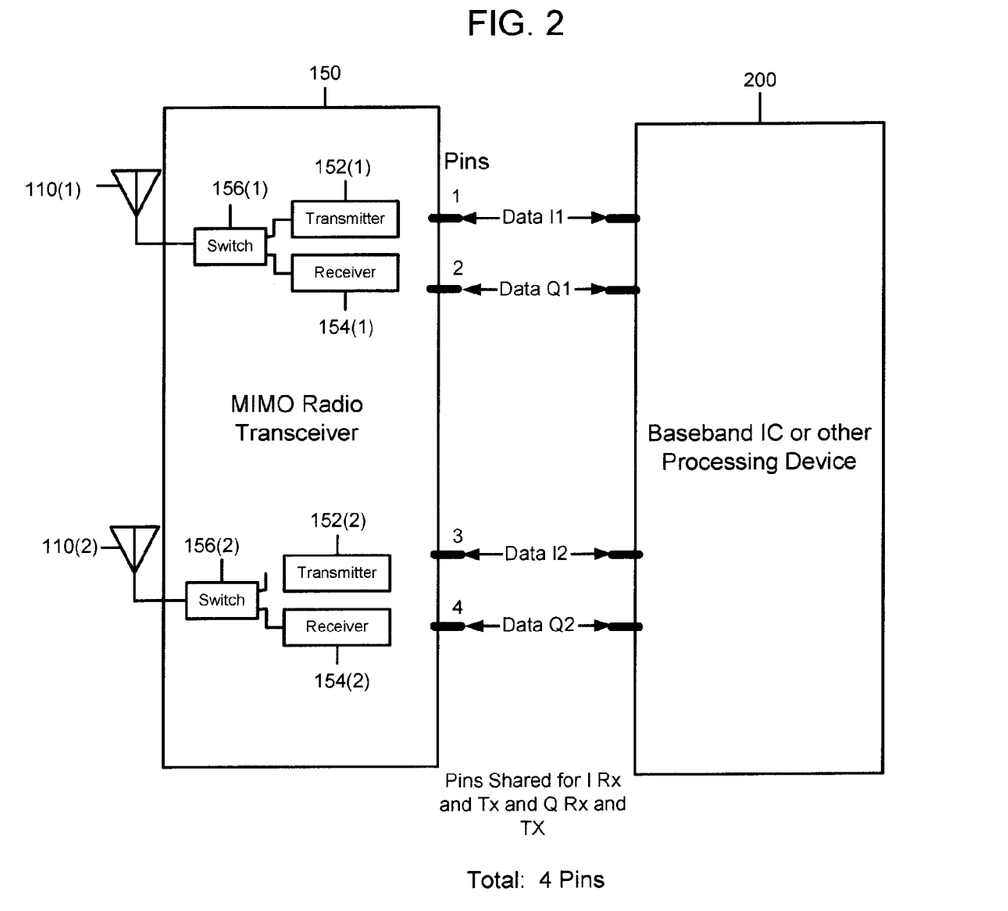
FIG. 2 is a block diagram of a radio IC and baseband IC connection scheme according to a first embodiment in which the number of connecting pins is reduced by sharing pins for transmit and receive signals.

Referring to FIG. 2, a configuration is shown in which a connection pin is shared to couple both transmit and receive signals between a radio IC and a baseband IC. The MIMO radio IC 150 connects to a baseband IC 200 via a plurality of pins numbered 1 through 4 onto each of which corresponding transmit and receive signals are multiplexed. It should be understood that there are a variety of other pins on the radio IC 150 unrelated to the techniques described herein and not shown for purposes of simplicity. The baseband IC 200 or other similar signal processing device performs baseband signal modulation of signals to be transmitted by the radio IC 150, and baseband demodulation of signals received by the radio IC. The baseband IC 200 can be any signal processing device (e.g., microprocessor, baseband signal processor, etc.) capable of processing signals supplied to, and receive from, the radio IC 150. In the configuration shown in FIG. 2, I and Q transmit (Tx) and receive (Rx) signals are used, and therefore, the transmitter and receiver each have I and Q signal paths.

In FIG. 2, the same pins are used bi-directionally, that is, for both transmit and receive modes. A differential I and Q signal configuration shown in FIG. 2 requires only 4 pins, as opposed to 8 pins in the configuration of FIG. 1. Associated with each antenna path, there are two pins, one each for Data I and Data Q. The signal on the appropriate pin is selected depending on whether the radio IC 150 is transmitting or receiving. For example, on pin 1 in receive mode, Rx DataI1 is coupled from the radio IC 150 to the signal line coupled thereto. In transmit mode, Tx DataI1 is coupled from the baseband IC 200 (or signal line connected thereto) to the radio IC 150. Similarly, Rx DataQ1 and Tx DataQ1 signals share pin 2, Rx DataI2 and Tx DataI2 share pin 3, and Rx DataQ2 and Tx DataQ2 share pin 4. This is an illustration of the transmit/receive sharing scheme and it may be extended to differential signals, or simplified to support multiplexing transmit and receive signals that do not use I and Q signals.

To be more precise in terms of operation of a MIMO radio IC, in a transmit mode, pins 1–4 are used to couple transmit signals from the baseband IC 200 to the radio IC 150 as follows:

Pin 1: Tx DataI1
Pin 2: Tx DataQ1
Pin 3: Tx DataI2
Pin 4: Tx DataQ2

The radio IC 150 processes these signals so that two signals Tx 1 (derived from RF processing Tx DataI1 and Tx DataQ1) and Tx 2 (derived from RF processing Tx DataI2 and Tx DataQ2) are simultaneously transmitted by radio IC 150.

On the other hand, in a receive mode, pins 1–4 are used to couple to the baseband IC 200 receive signals simultaneously received by the radio IC 150 as follows:

Pin 1: Rx DataI1
Pin 2: Rx DataQ1
Pin 3: Rx DataI2
Pin 4: Rx DataQ2

Figure 3:
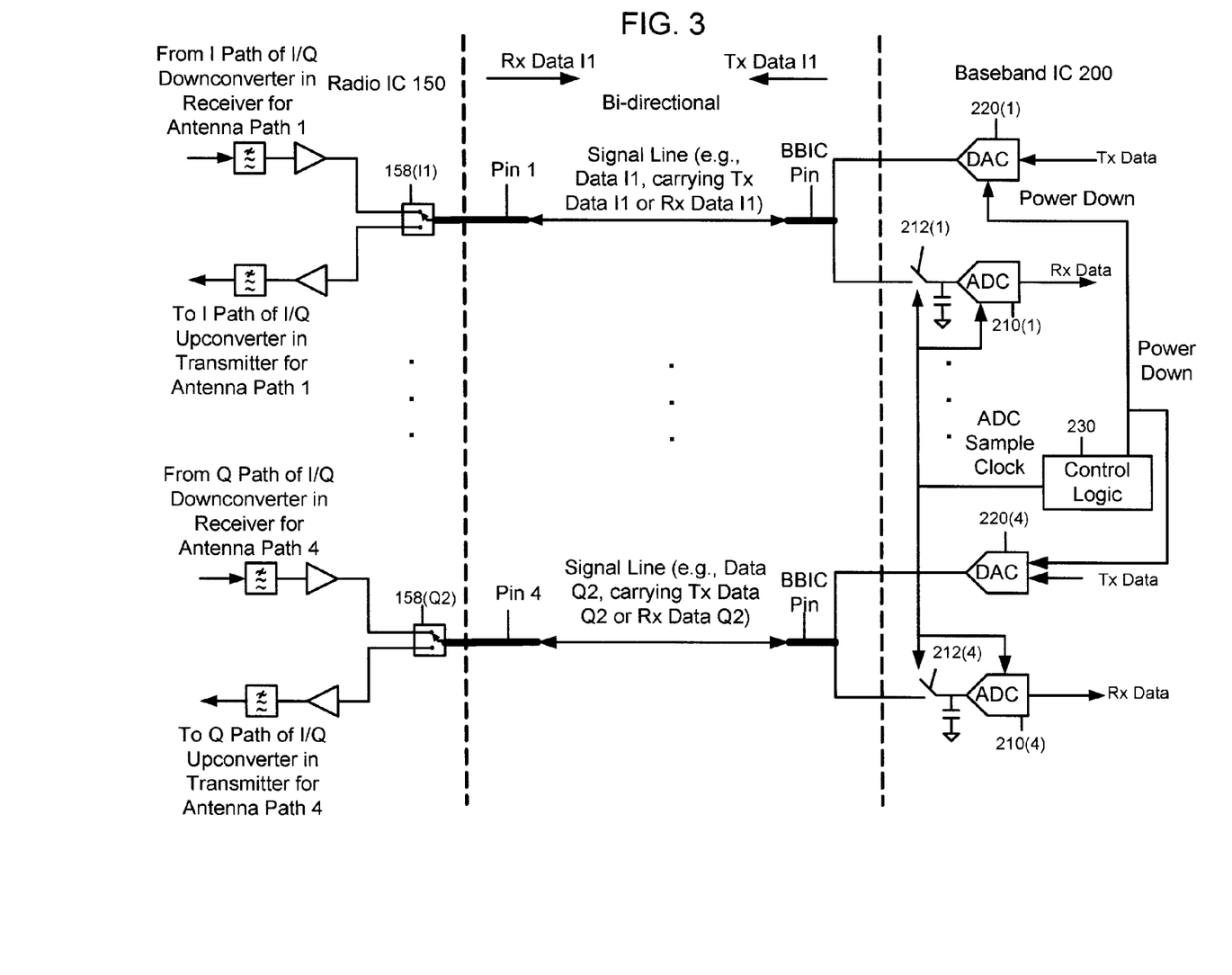
FIG. 3 is a schematic diagram of the relevant portions of a radio IC and a baseband IC to support the connection scheme shown in FIG. 2.

Turning to FIG. 3, the circuitry in the radio IC 150 and in the baseband IC 200 is shown that supports the transmit/receive pin sharing configuration shown in FIG. 2. Pin 1 shares Rx DataI1 and Tx DataI1. The circuitry is shown for one bi-directional data path between in 1 of the radio IC 150 and a signal line coupled to a counterpart pin of the baseband IC 200. This same circuitry is repeated for each of the radio IC connection pins 2–4. In the radio IC 150, there is an analog switch 158(I1) coupled to the connection in 1 that selects the position that connects to pin 1. In receive mode, the switch 158(I1) selects a switch position that couples the output of the low noise amplifier (LNA) in the I path of the I/Q downconverter of the receiver for antenna path 1 for coupling to the baseband IC 200. In transmit mode, the switch 158(I1) selects a position that couples the Tx Data I1 from the baseband IC 200 to the I path of the I/Q upconverter of the transmitter for antenna path 1.

Figure 4:
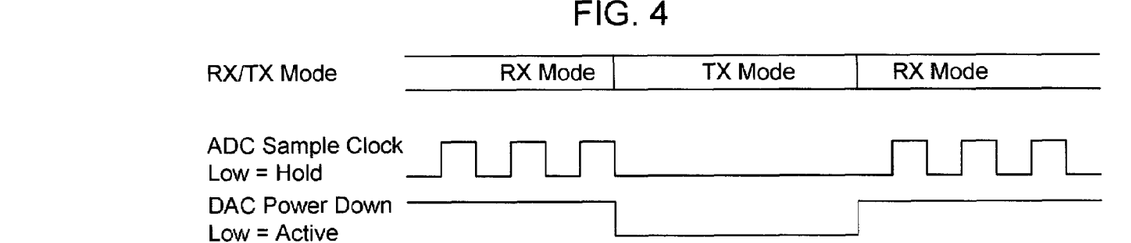
FIG. 4 is a timing diagram for the control signals associated with the circuitry shown in FIG. 3.

In the baseband IC 200 (or on another device or circuit board between the radio IC and the baseband IC), there is an analog-to-digital converter (ADC) 210(i) and a digital-to-analog converter (DAC) 220(i), for i=1 to 4. The DAC 220 is, for example, a standard current output type. The output of the DAC 220(i) and the input to the ADC(i) 210 are connected together to the corresponding pin either in the baseband IC 200 itself or on the board to which the baseband IC 200 is mounted. The ADC 210(i) converts a receive signal to a digital signal and the DAC 220(i) converts a transmit signal to an analog signal. A sample/hold (S/H) circuit 212(i) is coupled to the input of the ADC 210(i). A control circuit or logic 230 generates control signals to control the S/H circuits 212(i), the ADCs 210(i) and the DACs 220(i). Specifically, the control circuit 230 generates an ADC sample clock signal and a DAC power down signal. The ADCs 210(i) and S/H circuits 212(i) are controlled by the ADC sampling clock. The ADC sampling clock puts the ADC 210(i) in either a SAMPLE state (High) or a HOLD state (Low). The DACs 220(i) are controlled by the DAC power down signal which takes on either an ACTIVE state (Low) or an INACTIVE/power down state (High). The timing of these signals is shown in FIG. 4. The polarities of these signals could be reversed. The baseband IC 200 is normally in receive mode, until and if there is data to transmit, upon which it switches to transmit mode. Thus, the baseband IC 200 has control over the state of the ADCs 210 and DACs 220. The same circuitry arrangement is duplicated for the Q path of antenna path 1, the I path of antenna path 2 and the Q path of antenna path 2. Though not shown, there would be a switch 158(Q1) for the Q path of antenna path 1 and a switch 158(I2) for the I path of antenna path 2. FIG. 3 shows switch 158(Q2) for the Q path of antenna path 2 as well as the digital logic circuitry for the corresponding path in the baseband IC 200. A single control logic circuit 230 may integrate the control functions of the circuitry for all of the signal paths. Moreover, the ADCs 210(1) to 210(4) may be integrated into one ADC and the DACs 220(1) to 210(4) may be integrated into one ADC.

Figure 5:
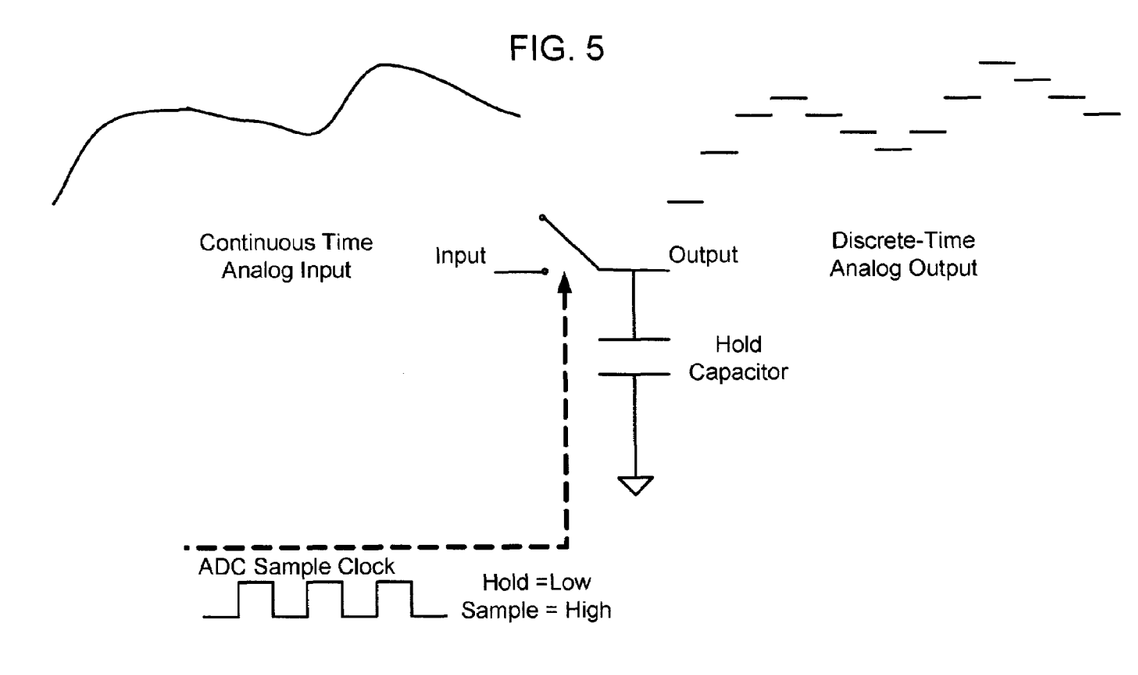
FIG. 5 is a timing diagram generally illustrating the how data is sampled in the receive path of the baseband IC under control of a sampling clock.

With reference to FIGS. 4 and 5, in the receive mode, each DAC 220(i) is switched to a power-down mode which has a high output impedance to minimize any signal coupling from the output of the DAC 220(i) onto the radio IC pin. In the transmit mode, the ADC's sample clock is held in the HOLD state rather than the SAMPLE (or TRACK) state. This creates a high input impedance at the ADC input to minimize signal coupling from the DAC 220(i) into the ADC 210(i) and the ADC 210(i) does not distort the waveform.

The bi-directional signal paths shown in FIGS. 2 and 3 have significant advantages over other designs, such as the one shown in FIG. 1. In terms of physical differences, there is a savings of at least half the number of pins. Moreover, reducing the number of pins and associated signal paths also reduces the on-chip noise.

To summarize and generalize the configuration depicted in FIGS. 2–5, a radio IC is provided that comprises at least one receiver that produces a receive signal and at least one transmitter that processes a transmit signal for transmission, and a connection pin that couples the transmit signal supplied to the radio IC for processing by the transmitter during a transmit mode and couple as output the receive signal produced by the receiver during a receive mode. A switch is coupled to the connection pin that in a first position (in the transmit mode) couples the connection pin to an input signal path of the transmitter to connect the transmit signal to the radio IC, and in a second position (in the receive mode) couples the connection pin to an output of the receiver to output the receive signal produced by the receiver. The transmitter and receiver may each have an in-phase (I) signal path and a quadrature (Q) signal path. In such a configuration, the radio IC has a connection pin associated with the in-phase (I) signal path that is shared for a transmit I signal or a receive I signal, and a connection pin associated with the quadrature (Q) signal path that is shared for a transmit Q signal or a receive Q signal. Furthermore, each of the transmitter and receiver may have differential signal paths. In this case, there is a pair of connection pins associated with the transmitter/receiver pair. For example, in the context of FIGS. 2 and 3, pins 1–4 would be replaced by 4 pairs of connection pins. Each pair of connection pins is shared to couple differential transmit signals supplied to the radio IC for processing by the transmitter and to couple as output differential receive signals produced by the receiver. If differential signals are employed, the supporting circuitry shown in FIG. 3, e.g., switches in the radio IC, ADCs and DACs would be capable of handling differential signals.

The radio IC may comprise a plurality of transmitters and a plurality of receivers arranged in transmitter/receiver pairs with each transmitter/receiver pair associated with a corresponding one of a plurality of antennas connected to the radio IC. A plurality of connection pins are provided on the radio IC, each pin associated with an I and Q signal path, if supported, of a corresponding transmitter/receiver pair. Each connection pin couples either a corresponding transmit signal to the radio IC for transmission processing or couples a corresponding receive signal produced by a corresponding receiver. Furthermore, associated with each transmitter/receiver pair is a corresponding one of a plurality of switches. Each switch in a first position couples the corresponding connection pin to the transmitter during a transmit mode to connect a corresponding transmit signal to the radio IC, and in a second position during a receive mode couples the connection pin to output a corresponding receive signal produced by the corresponding receiver. As described above, a multiple transmitter and receiver (i.e., MIMO) configuration may also support differential signals for each I and Q signal path of each transmitter and receiver. A system is formed by connecting the radio IC to a signal processing device that produces the plurality of transmit signals for transmission processing by the radio IC and that processes the plurality of receive signals produced by the radio IC.

According to the second embodiment, the transmit I and Q signals are multiplexed on the same pin during a transmit mode and the receive I and Q signals are multiplexed on the same pin during a receive mode. For example, the I and Q signals are alternately coupled on a connection pin during both transmit and receive modes. Referring to FIGS. 6 through 9, a scheme is shown to multiplex differential I and Q signals over the same pin.

Figure 6:
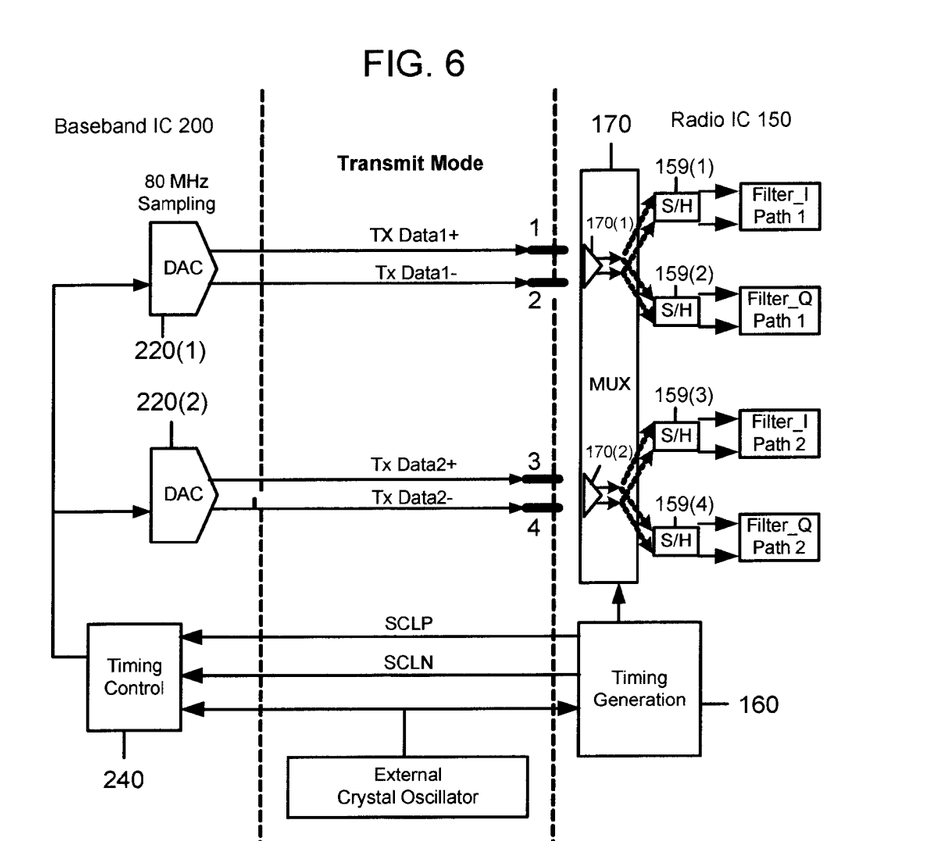
FIGS. 6–9 are diagrams showing a connection scheme according to a second embodiment using a technique that multiplexes I and Q signals over the same pin.
Figure 7:
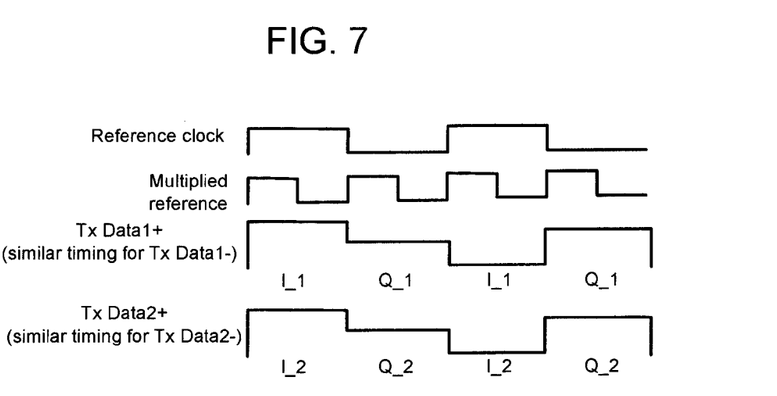

FIG. 6 shows the configuration in a transmit mode in which pins 1–4 are transmitter connection pins of the radio IC 150 and are used for multiplexing transmit I and Q signals to the radio IC 150. For example, signals Tx Data I1+ and Tx DataQ1+ are multiplexed on Pin 1. Signals Tx Data I1– and Tx Data Q1– are multiplexed on pin 2. Similarly, signals Tx Data I2+ and Tx Data Q2+ are multiplexed on pin 3, and signals Tx Data I2– and Tx Data Q2– are multiplexed on pin 4. A timing control block 240 is provided in the baseband IC 200 and a timing control block 160 is provided in the radio IC 150. The timing blocks are driven off of an external clock reference, and the clock signals synchronize clock+ (SCLP) and synchronize clock– (SCLN) generated in either the baseband IC 200 or radio IC 150 (are shared with the other IC) to coordinate the exchange of signals according to the timing pattern shown in FIG. 7, for example.

A multiplexer 170 in the radio IC 150 is controlled by a signal generated by the timing block 160 to route the appropriate Tx signals to a corresponding S/H circuit 159(1), 159(2), 159(3) and 159(4), respectively, and ultimately to a filter in the corresponding transmitter path. The multiplexer 170 comprises transmitter multiplexer circuits 170(1) to 170(2) to route the signals coupled to the transmitter connection pins to the appropriate S/H circuit for the appropriate transmitter signal path. For example, during a first time interval multiplexer circuit 170(1) routes from transmitter connection pins 1 and 2, respectively, Tx DataI1+ and Tx DataI1– to the S/H circuit 159(1) and subsequently during a second time interval routes from transmitter connection pins 1 and 2, respectively, Tx DataQ1+ and Tx DataQ1– to the S/H circuit 159(2). Similarly, during the first time interval multiplexer circuit 170(2) routes from transmitter connection pins 3 and 4, respectively, Tx DataI2+ and Tx DataI2– to S/H circuit 159(3) and subsequently during the second time interval routes from transmitter connection pins 3 and 4, respectively, Tx DataQ2+ and Tx DataQ2– to S/H circuit 159(4). Thus, the transmitter multiplexer circuits couple during different time intervals (e.g., alternately couple) the transmit I signal and transmit Q signal from the corresponding transmitter connection pin to I and Q signal paths, respectively, of the transmitter in the radio IC 150.

Figure 8:
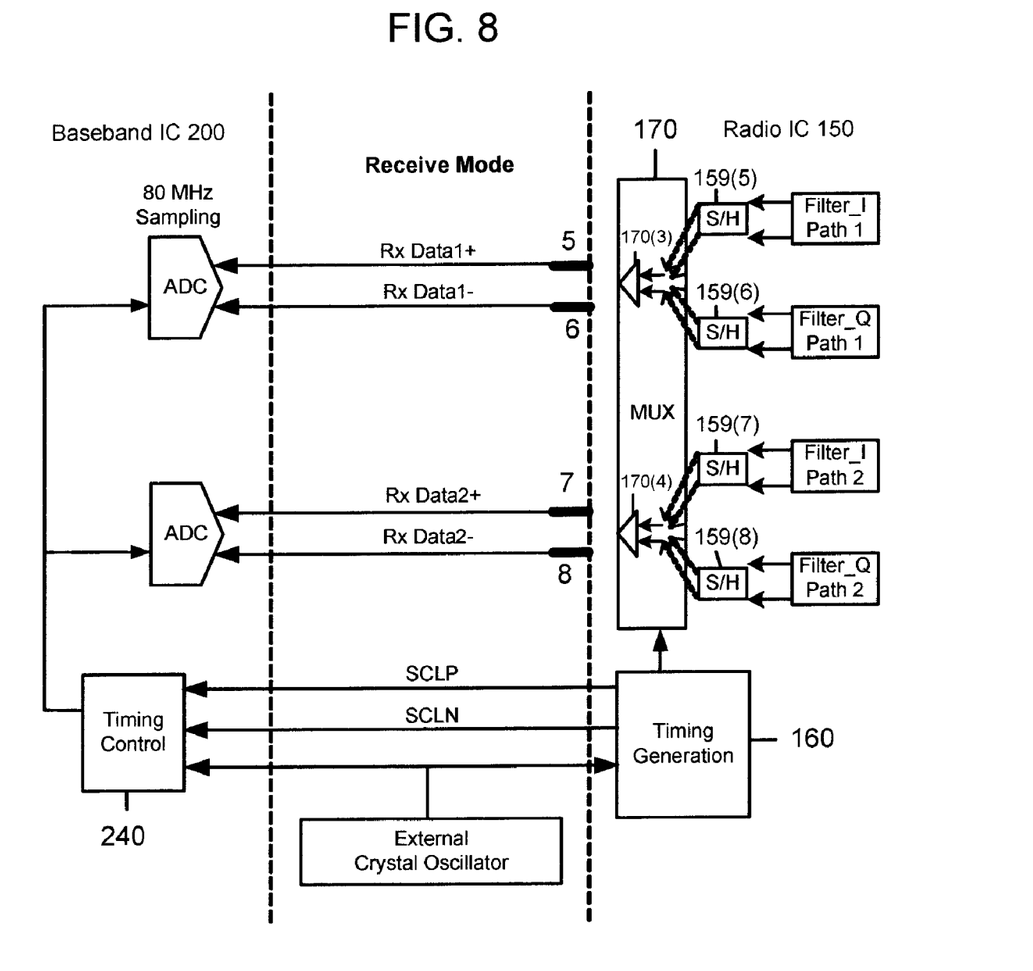

FIG. 8 shows how signals are multiplexed from the radio IC 150 to the baseband IC 200 in a receive mode on receiver connection pins 5–8. The multiplexer 170 comprises receiver multiplexer circuits 170(3) and 170(4) that route the receive signals produced by the radio IC 150. Similar to FIGS. 6 and 7, the timing blocks 240 and 160 coordinate the exchange of signals according to the timing pattern shown in FIG. 9. For example, during a first time interval multiplexer 170(3) routes to receiver connection pins 5 and 6, respectively, Rx DataI1+ and Rx DataI1– from S/H circuit 159(5) and subsequently during a second time interval routes to receiver connection pins 5 and 6, respectively, Rx DataQ1+ and Rx DataQ1– from S/H circuit 159(6). Similarly, during the first time interval multiplexer 170(4) routes to receiver connection pins 7 and 8, respectively, Rx DataI2+ and Rx DataI2– from S/H circuit 159(7) and subsequently during a second time interval routes to receiver connection pins 7 and 8, respectively, Rx DataQ2+ and Rx DataQ2– from S/H circuit 159(8). Thus, the receiver multiplexer circuits couple during different time intervals (e.g., alternately couple) receive I and Q signals to the corresponding receiver connection pin from the I and Q signal paths, respectively, of the receiver in the radio IC.

While FIGS. 6 and 8 show separate multiplexer circuits to handle the signal routing for transmit mode and for receive mode, it should be understood that one set of multiplexer circuits may supported the multiplexing operations for both transmit and receive modes. In this case, there would be a plurality of multiplexer circuits each associated with a corresponding transmitter/receiver pair that multiplexes the corresponding transmit I signal and transmit Q signal from the corresponding transmitter connection pin to the respective I and Q signal paths of the corresponding transmitter, and that multiplexes the corresponding receive I signal and receive Q signal from the respective I and Q signal paths of the corresponding receiver to the corresponding receiver connection pin. The same is true for the S/H circuits.

Moreover, while the foregoing description of FIGS. 6–9 describes that the I signal is coupled during a time interval before the Q signal, it should be understood the order may be reversed. Furthermore, while FIGS. 6–9 show an implementation for differential signals, the same techniques may be applied to single-ended signals, in which case the multiplexer circuits and S/H circuits would handle single-ended signals. Further still, while the multiplexing technique described above and shown in FIGS. 6–9 is one that alternates usage of the connection pin between an I signal (I time interval) and a Q signal (Q time interval), other multiplexing patterns are envisioned such as Q-I-Q-I-Q-I or I-I-Q-Q-I-I-Q-Q, or other pattern that may be useful. The connection pin is used during different time intervals (hence "multiplexed") for either an I signal or a Q signal.

To summarize and generalize the configurations of FIGS. 6–9, a radio transceiver integrated circuit (IC) is provided comprising at least one transmitter and at least one receiver, each of which includes an in-phase (I) signal path and a quadrature (Q) signal path; a transmitter connection pin on which a transmit I signal and a transmit Q signal are multiplexed for connection to the respective I and Q signal paths of the transmitter; and a receiver connection pin on which a receive I signal and a receive Q signal are multiplexed from the respective I and Q signal paths of the receiver. When the I and Q signals on a connection pin are multiplexed in this manner, they are coupled on the pin during different time intervals. For example, the I signal is coupled during a first time interval and the Q signal is coupled during a second time interval subsequent the first time interval. This alternating pattern repeats until the transfer session is complete. If the I and Q signal paths of the transmitter and receiver are differential, there is a pair of transmitter connection pins on which differential transmit I and transmit Q signals are multiplexed (e.g., alternately coupled), and a pair of receiver connection pins on which differential receive I and receive Q signals are multiplexed (e.g., alternately coupled). There may be separate transmitter and receiver multiplexer circuits to handle the transmit I and Q multiplexing, or one multiplexer circuit to handle both transmit I and Q multiplexing and receive I and Q multiplexing. In the latter case, the multiplexer circuit during a receive mode couples to the receiver connection pin the receive I and receive Q signals during different time intervals from the I and Q signal paths, respectively, of the receiver, and during a transmit mode, couples from the transmitter connection pin the transmit I and transmit Q signals during different time intervals to the I and Q signal paths, respectively of the transmitter.

The radio IC may comprise a plurality of transmitters and a plurality of receivers, wherein a transmitter/receiver pair is associated with a corresponding one of a plurality of antennas connected to the radio IC. In this case, there is a plurality of transmitter connection pins each associated with a corresponding transmitter and a plurality of receive connection pins each associated with a corresponding receiver. On each transmitter connection pin corresponding transmit I and Q signals are multiplexed (e.g., alternately coupled) to the I and Q signal paths, respectively, of the associated transmitter. Similarly, on each receiver connection pin corresponding receive I and receive Q signals are multiplexed (e.g., alternately coupled) from the I and Q signal paths, respectively, of the associated receiver. If each of the I and Q signal paths of each of the transmitters and receivers has differential signal paths, then there is a plurality of pairs of transmitter connection pins on which corresponding differential transmit I and transmit Q signals are multiplexed (e.g., alternately coupled) to the I and Q signal paths, respectively, of the associated transmitter. This is the configuration shown in FIG. 6. Similarly, there is a plurality of pairs of receiver connection pins on which corresponding differential receive I and receive Q signals are multiplexed (e.g., alternately coupled) from the I and Q signal paths, respectively, of the associated receiver. This is the configuration shown in FIG. 8.

A system may be formed from the radio IC and a signal processing device (e.g., a baseband IC) that are connected together, whereby the signal processing device supplies the transmit I and Q signals to the radio IC for transmission processing and processes the receive I and Q signal from the radio IC. In this system, there may be a timing circuit in the radio IC and a timing circuit in the signal processing device. One of these circuits generates timing signals that are shared with the other in order to coordinate the transfer of transmit I and transmit Q signals from the signal processing device to the radio IC and to coordinate transfer of the receive I and Q signals from the radio IC to the signal processing device.

The techniques shown in FIGS. 2–5 may have certain advantages over the techniques shown in FIGS. 6–9. For certain applications, there may be less risk (and thus greater development schedule predictability) in developing and fabricating an IC using the design of FIGS. 2–5 than the design of FIGS. 6–9 because the timing coordination is much less complex to implement than a scheme that time-multiplexes I and Q signals over the same pin. In addition, depending on the application, for a 2-antenna path MIMO radio IC using I and Q differential signals, the techniques of FIGS. 2–5 use approximately 10% less silicon area and 20% less power than the techniques of FIGS. 6–9.

Figure 9:
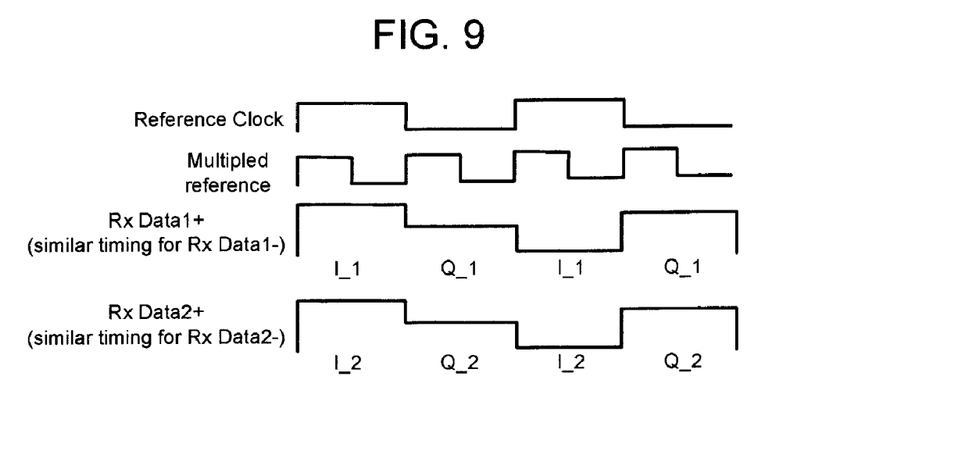

As an example, a MIMO radio IC that has 2-antenna paths and uses differential I and Q signal paths for each transmitter and receiver would require 16 pins for the transmit and receive signals using the technique of FIG. 1, 9 pins using the technique of FIGS. 2–5 (including a miscellaneous additional pin for control) and 12 pins using the technique of FIGS. 6–9. In addition, the die area is pad limited using the technique of FIG. 1, core limited using the technique of FIGS. 2–5, and pad/core limited using the technique of FIGS. 6–9. The connection configuration of FIGS. 2–5 may use less power than the technique of FIGS. 6–9.

While the foregoing techniques have been described in connection with a MIMO radio IC, it should be understood that they are useful for single antenna path radio ICs having a single transmitter and a single receiver, or to a transmitter IC and receiver IC. Moreover, as described above, the techniques are applicable to systems that use differential or single-ended signals, as well as systems that use in-phase and quadrature signals (I and Q) or a single phase signals. The method may be employed to connect signals between at least one of a radio transmitter and a radio receiver (not necessarily on the same integrated circuit) and a signal processing device by multiplexing two or more signals on a connection pin between the signal processing device and one or both of the radio transmitter and radio receiver. Furthermore, while these techniques are described as being useful to reduce the number of pins required on a radio IC, they also reduce the number of pins required on a baseband IC or other similar processing device that couples to the radio IC. This is clearly evident by the diagrams of FIGS. 2, 3, 4, 6 and 8 in which, in the context of the techniques described herein, for the radio IC pins shown, there may be a corresponding baseband IC pin.

The above description is intended by way of example only.

The invention claimed is:

1. A method for connecting signals between a radio integrated circuit (IC) and a signal processing device comprising the step of multiplexing two or more signals on a connection pin between the radio IC and the signal processing device;
   wherein in a transmit mode, the step of multiplexing comprises multiplexing a transmit in-phase (I) signal and a transmit quadrature (Q) signal on a connection pin between the radio IC and the signal processing device, and;
   wherein in a receive mode, the step of multiplexing comprises multiplexing a receive in-phase (I) signal and a receive quadrature (Q) signal on a connection pin between the radio IC and the signal processing device.

2. The method of claim 1, wherein the step of multiplexing comprises multiplexing transmit and receive signals on the connection pin such that during a transmit mode a transmit signal is coupled on the connection pin from the signal processing device to the radio IC, and during a receive mode a receive signal is coupled from the radio IC on the connection pin to the signal processing device.

3. The method of claim 2, wherein the step of multiplexing is performed on each of a plurality of connection pins between the radio IC and the signal processing device for a plurality of corresponding transmit and receive signals.

4. The method of claim 2, wherein the step of multiplexing is performed on each of a pair of connection pins associated with differential transmit signals and differential receive signals.

5. A radio transceiver integrated circuit (IC) comprising:
   a. at least one transmitter and at least one receiver, each of which includes an in-phase (I) signal path and a quadrature (Q) signal path;
   b. a transmitter connection pin on which a transmit I signal and a transmit Q signal are multiplexed for connection to the respective I and Q signal paths of the transmitter; and
   c. a receiver connection pin on which a receive I signal and a receive Q signal are multiplexed from the respective I and Q signal paths of the receiver.

6. The radio IC of claim 5, and further comprising a first multiplexer circuit that couples from the transmitter connection pin the transmit I and transmit Q signals during different time intervals for connection to the I and Q signal paths, respectively, of the transmitter.

7. The radio IC of claim 6, wherein the first multiplexer circuit alternately couples the transmit I and transmit Q signals, respectively, from the transmitter pin to the I and Q signal paths, respectively, of the transmitter.

8. The radio IC of claim 6, and further comprising a second multiplexer circuit that couples during different time intervals the receive I and receive Q signals to the receiver connection pin from the I and Q signal paths, respectively, of the receiver.

9. The radio IC of claim 8, wherein the second multiplexer circuit alternately couples the receive I and receive Q signals to the receiver connection pin from the I and Q paths, respectively, of the receiver.

10. The radio IC of claim 5, and further comprising a multiplexer circuit that during a receive mode couples to the receiver connection pin the receive I and receive Q signals during different time intervals from the I and Q signal paths, respectively, of the receiver, and during a transmit mode, couples from the transmitter connection pin the transmit I and transmit Q signals during different time intervals to the I and Q signal paths, respectively of the transmitter.

11. The radio IC of claim 10, and further comprising a timing circuit that supplies a timing signal to the multiplexer circuit to control the timing of the first and second multiplexer circuits.

12. The radio IC of claim 5, and further comprising a plurality of transmitters and a plurality of receivers such that a pair of a transmitter and a receiver are associated with a corresponding one of a plurality of antennas connected to the radio IC, and further comprising a plurality of transmitter connection pins each associated with a corresponding transmitter and a plurality of receiver connection pins each associated with a corresponding receiver, each transmitter connection pin on which corresponding transmit I and transmit Q signals are multiplexed for connection to the I and Q signal paths, respectively, of the associated transmitter and each receiver connection pin on which corresponding receive I and receive Q signals are multiplexed for connection from the I and Q signal paths, respectively, of the associated receiver.

13. The radio IC of claim 12, and further comprising a plurality of transmitter multiplexer circuits each associated with a corresponding transmitter to multiplex the corresponding transmit I signal and transmit Q signal from the corresponding transmitter connection pin to the respective I and Q signal paths of the corresponding transmitter.

14. The radio IC of claim 13, wherein each transmitter multiplexer circuit alternately couples the corresponding transmit I signal and transmit Q signal from the corresponding transmitter connection pin to the respective I and Q signal paths of the corresponding transmitter.

15. The radio IC of claim 12, and further comprising a plurality of receiver multiplexer circuits each associated with a corresponding receiver to multiplex the corresponding receive I signal and receive Q signal from the respective signal paths of the corresponding receiver to the corresponding receiver connection pin.

16. The radio IC of claim 15, wherein each receiver multiplexer circuit alternately couples the corresponding receive I and receive Q signal to the corresponding receiver connection pin from the respective I and Q signal paths of the corresponding receiver.

17. The radio IC of claim 12, and further comprising a plurality of multiplexer circuits each associated with a corresponding transmitter/receiver pair that multiplexes the corresponding transmit I signal and transmit Q signal from the corresponding transmitter connection pin to the respective I and Q signal paths of the corresponding transmitter, and that multiplexes the corresponding receive I signal and receive Q signal from the respective I and Q signal paths of the corresponding receiver to the corresponding receiver connection pin.

18. The radio IC of claim 12, wherein each of the I and Q signal paths of each the of transmitters and receivers having differential signal paths, and further comprising a plurality of pairs of transmitter connection pins on which corresponding differential transmit I and transmit Q signals are multiplexed, and a plurality of pairs of receiver connection pins on which corresponding differential receive I and receive Q signals are multiplexed.

19. The radio IC of claim 5, wherein each of the I and Q signal paths of the transmitter and receiver are differential, and further comprising a pair of transmitter connection pins on which differential transmit I and transmit Q signals are multiplexed, and a pair of receiver connection pins on which differential receive I and receive Q signals are multiplexed.

20. The radio IC of claim 19, and further comprising a plurality of transmitters and a plurality of receivers such that a pair of a transmitter and a receiver are associated with a corresponding one of a plurality of antennas connected to the radio IC, and further comprising a plurality of pairs of transmitter connection pins each pair associated with a corresponding transmitter and a plurality of pairs of receiver connection pins each pair associated with a corresponding receiver, each pair of transmitter connection pins on which corresponding differential transmit I and transmit Q signals are multiplexed to the I and Q signal paths, respectively, of the associated transmitter and each pair of receiver connection pin on which corresponding differential receive I and receive Q signals are multiplexed from the I and Q signal paths, respectively, of the associated receiver.

21. A system comprising the radio IC of claim 5, and further comprising a signal processing device coupled to the radio IC that supplies the transmit I signal and transmit Q signal to the radio IC for transmission processing and processes the receive I signal and receive Q signal from the radio IC.

22. The system of claim 21, and further comprising a timing circuit in the radio IC and a timing circuit in the signal processing device, wherein the timing circuit in the radio transceiver or timing circuit in the signal processing device generates timing signals that are coupled to the other timing circuit in order to coordinate the transfer of transmit I and transmit Q signals from the signal processing device to the radio IC and to coordinate transfer of the receive I and receive Q signals from the radio IC to the signal processing device.

23. The system of claim 22, wherein the radio IC further comprises at least one multiplexer circuit coupled to the timing circuit in the radio IC and is responsive to timing signals supplied by the timing circuit to couple from the transmitter connection pin the transmit I and transmit Q signals during different time intervals for connection to the I and Q signal paths, respectively, of the transmitter, and to couple to the receiver connection pin the receive I and receive Q signals during different time intervals from the I and Q signal paths, respectively, of the receiver.

\* \* \* \* \*

UNITED STATES PATENT AND TRADEMARK OFFICE
CERTIFICATE OF CORRECTION

PATENT NO. : 7,058,383 B2
APPLICATION NO. : 10/707447
DATED : June 6, 2006
INVENTOR(S) : Sugar et al.

It is certified that error appears in the above-identified patent and that said Letters Patent is hereby corrected as shown below:

ON THE TITLE PAGE

At section (54), TITLE, left column, page 1, line 1, after the word "INTERFACING", delete "TECHINQUES" and insert therefor --TECHNIQUES--.

IN THE SPECIFICATION

At column 1, line 1, after the word "INTERFACING", delete "TECHINQUES" and insert therefor --TECHNIQUES--.

At column 1, line 19, after the word "consumption,", delete "onchip" and insert therefor --on-chip--.

At column 2, line 21, after the word "illustrating", delete "the".

At column 2, line 61, after the word "well", delete "than" and insert therefor --then--.

At column 3, line 19, after the words "to, and", delete "receive" and insert therefor --received--.

At column 3, line 64, after the word "between", delete "in" and insert therefor --pin--.

At column 4, line 1, after the word "switch", delete "158(II)" and insert therefor --158(I1)--.

At column 4, line 1, after the word "connection", delete "in" and insert therefor --pin--.

At column 4, line 3, after the word "switch", delete "158(II)" and insert therefor --158(I1)--.

At column 4, line 7, after the word "switch", delete "158(II)" and insert therefor --158(I1)--.

At column 4, line 41, after the word "switch", delete "158(12)", and insert therefor --158(I2)--.

At column 6, line 64, after the word "may", delete "supported" and insert therefor --support--.

At column 7, line 10, after the word "understood", insert --that--.

UNITED STATES PATENT AND TRADEMARK OFFICE
CERTIFICATE OF CORRECTION

PATENT NO. : 7,058,383 B2
APPLICATION NO. : 10/707447
DATED : June 6, 2006
INVENTOR(S) : Sugar et al.

It is certified that error appears in the above-identified patent and that said Letters Patent is hereby corrected as shown below:

At column 7, line 20, after the word "other", delete "pattern" and insert therefor --patterns--.

At column 7, line 37, after the word "subsequent", insert --to--.

At column 8, line 62, before the word "single", delete "a".

Signed and Sealed this

Twenty-fourth Day of April, 2007

JON W. DUDAS
*Director of the United States Patent and Trademark Office*